(12) United States Patent
Savasoglu et al.

(10) Patent No.: US 7,899,724 B1
(45) Date of Patent: Mar. 1, 2011

(54) ENHANCED REMARKETABLE SECURITIES

(75) Inventors: Serkan Savasoglu, New York, NY (US); Kevin G. Woodruff, New York, NY (US); Nathan N. McMurtray, New York, NY (US)

(73) Assignee: Morgan Stanley, New York, NY (US)

( * ) Notice: Subject to any disclaimer, the term of this patent is extended or adjusted under 35 U.S.C. 154(b) by 1641 days.

(21) Appl. No.: 10/677,172

(22) Filed: Oct. 2, 2003

Related U.S. Application Data

(60) Provisional application No. 60/499,039, filed on Aug. 29, 2003.

(51) Int. Cl.
*G06Q 40/00* (2006.01)

(52) U.S. Cl. .......................... 705/35; 705/36 R

(58) Field of Classification Search ............... 705/35–42
See application file for complete search history.

(56) References Cited

U.S. PATENT DOCUMENTS

| | | | |
|---|---|---|---|
| 4,839,804 A | 6/1989 | Roberts et al. | |
| 5,832,461 A | 11/1998 | Leon et al. | |
| 5,930,777 A | 7/1999 | Barber | |
| 6,263,321 B1* | 7/2001 | Daughtery, III | 705/36 R |
| 6,321,212 B1 | 11/2001 | Lange | |
| 7,219,079 B2 | 5/2007 | Birle, Jr. et al. | |
| 7,222,094 B2 | 5/2007 | Ross | |
| 7,236,955 B2* | 6/2007 | Sugahara | 705/37 |
| 7,249,083 B2 | 7/2007 | Noraev et al. | |
| 7,257,555 B1* | 8/2007 | Farr | 705/36 R |
| 7,257,556 B1* | 8/2007 | Rifkin | 705/36 R |
| 7,305,362 B2 | 12/2007 | Weber et al. | |
| 7,747,488 B2* | 6/2010 | Jones et al. | 705/35 |
| 7,788,154 B1* | 8/2010 | Jones et al. | 705/36 R |
| 7,805,347 B1* | 9/2010 | Jones et al. | 705/36 R |
| 2001/0037277 A1* | 11/2001 | Willis et al. | 705/36 |
| 2002/0103852 A1* | 8/2002 | Pushka | 709/203 |
| 2002/0120542 A1 | 8/2002 | Higgins | |
| 2002/0133456 A1 | 9/2002 | Lancaster et al. | |
| 2002/0138382 A1* | 9/2002 | Seaman | 705/36 |
| 2002/0138420 A1* | 9/2002 | Seaman | 705/39 |
| 2002/0147670 A1 | 10/2002 | Lange | |
| 2002/0178111 A1 | 11/2002 | Woodley | |

(Continued)

OTHER PUBLICATIONS

Craig, Pirrong, "Manipulation of Cash-Settled Futures Contracts", JSTOR: The Journal of Business, vol. 74, No. 2, (2001). pp. 224.*

(Continued)

*Primary Examiner* — Ella Colbert
*Assistant Examiner* — Mohammad Z Shaikh
(74) *Attorney, Agent, or Firm* — K&L Gates LLP

(57) ABSTRACT

A unit may include a forward contract and a remarketable security that secures performance of obligations of the forward contract. The forward contract may require a holder to purchase a quantity of stock from an issuer at a settlement price on or before a settlement date. The remarketable security may have an issue denomination and a maturity date that is later than the settlement date.

At the time of issue, the unit may provide that the remarketable security is to be offered to new holders at a remarketing time at a remarketing denomination that is different from the issue denomination. The unit also may provide, at time of issue, that the remarketable security is to be remarketed with a remarketing coupon frequency different from an issue coupon frequency, without subordination to senior debt of the issuer, and/or without a previously available interest rate deferral option to the issuer.

19 Claims, 4 Drawing Sheets

U.S. PATENT DOCUMENTS

| | | | |
|---|---|---|---|
| 2003/0009406 A1* | 1/2003 | Ross | 705/36 |
| 2003/0130941 A1* | 7/2003 | Birle et al. | 705/40 |
| 2003/0163400 A1* | 8/2003 | Ross et al. | 705/35 |
| 2003/0182219 A1 | 9/2003 | Bodurtha et al. | |
| 2003/0225656 A1* | 12/2003 | Aberman et al. | 705/36 |
| 2003/0233313 A1* | 12/2003 | Bartolucci | 705/37 |
| 2004/0006520 A1* | 1/2004 | Birle et al. | 705/35 |
| 2004/0039669 A1* | 2/2004 | Jones et al. | 705/35 |
| 2004/0133494 A1* | 7/2004 | Jones et al. | 705/35 |
| 2004/0153388 A1 | 8/2004 | Fisher et al. | |
| 2004/0193536 A1* | 9/2004 | Marlowe-Noren | 705/39 |
| 2005/0033674 A1* | 2/2005 | Jones et al. | 705/35 |
| 2005/0075959 A1 | 4/2005 | Woodruff et al. | |
| 2005/0075976 A1 | 4/2005 | Woodruff et al. | |
| 2005/0102207 A1 | 5/2005 | Savasoglu et al. | |
| 2005/0102213 A1 | 5/2005 | Savasoglu et al. | |
| 2005/0160025 A1 | 7/2005 | Birle et al. | |
| 2006/0020526 A1* | 1/2006 | Viner | 705/35 |
| 2006/0212380 A1 | 9/2006 | Williams et al. | |
| 2006/0218069 A1 | 9/2006 | Aberman et al. | |

OTHER PUBLICATIONS

Internal Revenue Service Bulletin: 2003-97; p. 3: paragraph 5.*
"FSA forgoes conventional wisdom in characterizing a remarketing payment under a callable/putttable bond" by Jo Lynn Ricks, Thomas J. Kelly. The Tax Adviser. New York: Mar. 2002. vol. 33, iss 3, p. 168, herein FSA.*
Journal of Business, vol. 74, No. 2 (2001) p. 224.*
Internal Revenue Service Bulletin: 2003-97; pag 3: paragraph 5.*
"FSA forgoes conventional wisdom in characterizing a remarketing payment under a callable/puttable bond" by Jo Lynn Ricks, Thomas J. Kelly. The Tax Adviser. New York: Mar. 2002. vol. 33, iss 3, p. 168.*
Journal of Business, vol. 74: No. 2( 2001) p. 224.*
"FSA forgoes conventional wisdom in characterizing a remarketing payment under a callable/puttable bond" by Jo Lynn Ricks, Thomas J. Kelly. The Tax Adviser. New York: Mar. 2002. vol. 33, iss 3, p. 168.*
Journal of Business, vol. 74: No. 2(2001) p. 224.*
Internal Revenue Service Bulletin: 2003-97; p. 3; paragraph 5.*
Jo Lynn Ricks & Thomas J. Kelly, "FSA forgoes conventional wisdom in characterizing a remarketing payment under a callable/puttable bond", The Tax Adviser New York: Mar. 2002, vol. 33, iss 3, p. 168.*
"Internal Revenue Service Issues Guidance on Popular Equity-Linked Financial Products" by Sherman & Sterling LLP, Jul. 2003, pp. 1-3.*
Prospectus Supplement, Public Service Enterprise Group Incorporated (PSEG) Sep. 5, 2002.
Prospectus Supplement, The Hartford Financial Services Group, Inc., Sep. 9, 2002.
Office Action, United States Patent and Trademark Office, U.S. Appl. No. 10/679,071, Aug. 3, 2007.
Office Action, United States Patent and Trademark Office, U.S. Appl. No. 10/679,054, Jul. 31, 2007.
Office Action issued on Sep. 18, 2007 in U.S. Appl. No. 10/703,978.
Office Action issued on Jan. 23, 2008 in U.S. Appl. No. 10/679,054.
Office Action issued on Jul. 22, 2008 in U.S. Appl. No. 10/679,054.
Office Action issued on Jan. 9, 2008 in U.S. Appl. No. 10/679,071.
Office Action issued on Aug. 20, 2008 in U.S. Appl. No. 10/679,071.
Office Action issued on Oct. 1, 2007 in U.S. Appl. No. 10/703,975.
Office Action issued on Apr. 21, 2008 in U.S. Appl. No. 10/703,975.
Downes, John & J.E. Goodman, Barron's Dictionary of Finance and Investment Terms, 1998, 5th Edition, pp. 695 and 607.
Faerber, Esme, "All About Bonds and Bond Mutual Funds: The Easy Way to Get Started," New York, McGraw-Hill, 2000, pp. 28, 40, 225, 226, 236.
Internal Revenue Service Ruling 2002-31, published May 6, 2002, Section 1275—Other definitions and special rules, 26 CFR 1.1275.4, Contingent payment debt instruments, pp. 1-4.
Internal Revenue Service Ruling 2003-97, Deductibility of Interest, published Aug. 25, 2003, pp. 1-9.
Treasury and Internal Revenue Service, Jul. 23, 2003, Rev. Rul. 2003-97.

* cited by examiner

ENHANCED REMARKETABLE SECURITIES

This application claims the priority benefit of U.S. Provisional Application No. 60/499,039, which was filed on Aug. 29, 2003 and is incorporated by reference in its entirety.

TECHNICAL HELD

The present invention relates generally to investment instruments and, more particularly, to systems and techniques for remarketing investment securities.

BACKGROUND

Firms traditionally have issued conventional securities such as straight debt and common stock in order to raise capital. In general, straight debt securities (e.g., bonds, notes, loans, mortgages) raise capital by borrowing and promising to repay a principal amount and interest on a specified future date. Common stock securities, on the other hand, raise capital by selling an equity interest in the firm. Owners of common stock typically receive voting rights regarding firm matters and may benefit through appreciation of the stock value and/or receiving dividends.

In addition to conventional types of securities, firms also have a variety of more sophisticated hybrid investment instruments at their disposal. These hybrid securities often may have attributes of several different types of securities (e.g., debt components and equity components) and may change optionally or automatically at certain points in time or depending on market conditions. Convertible securities, such as convertible debt, for instance, provide the issuer and/or the holder with the option of exchanging the convertible securities for other related securities, such as common stock. Convertible securities may be attractive to investors due to the mix of features, for example, earning interest like bonds when the stock price is down or flat and increasing in value like common stock when the stock price rises.

Mandatory convertible securities are another type of hybrid, which as the name implies, automatically convert into common stock on a specified future date. Mandatory convertible securities can have a variety of payoff structures that determine the number of shares of common stock provided to the holder. Typically, the number of shares will depend on the market price of the stock on the conversion date relative to certain threshold prices and limits on appreciation.

Unit structures are another relatively recent type of hybrid, which include a forward contract and security component, such as a note. Generally, the forward contract is a purchase contract requiring the holder to buy a quantity of common stock from an issuer for a given price on or before a certain settlement date. The note secures performance of the investor's obligations under the forward contract on the settlement date (e.g. the note is pledged as collateral) and the note matures at a point in time later than the forward contract settlement date. On the settlement date, the investor pays the settlement price and receives a quantity of common stock according to a payoff function. Again, the number of shares provided to the holder may depend on the market price of the stock on the conversion date relative to certain threshold prices and limits on appreciation.

In unit structures, the remaining term of the note beyond the settlement date, in many cases, may be two years or even longer. As such, the investor may attempt to remarket the debt to new investors. If remarketing to a new investor is successful, the proceeds from the sale can be used to satisfy the purchase price of the forward contract.

Unit structured mandatory convertible securities of the type described above may or may not be designed so that the interest payments on the fixed income security portion of the unit are tax deductible. To achieve tax-deductibility, the fixed income security is generally designed to mature at least two years after the settlement of the forward purchase contract. This separation is necessary because tax rules generally disallow deductions for debt that is repaid at maturity in equity and will even integrate separate transactions that occur roughly contemporaneously if the combined transactions would effectively have the economic effect of repaying debt with equity. If the forward contract and the fixed income security matured at or near the same point in time, the two components might be integrated for tax purposes. This possibility arises because the amount the holder is obligated by the forward purchase contract to pay the issuer (in exchange for common stock) typically matches the amount the issuer is obligated by the fixed income security to repay the holder. As a result, the economic effect is that debt (the fixed income security) has been repaid with equity since the payments on the forward purchase contract and the fixed income security offset each other and the holder is left with common stock. The two-year difference in settlement and maturity dates prevents this integration since the settlement and maturity no longer occur contemporaneously and the economic effect is different (for instance, the issuer of the fixed income security still owes the holder its full principal amount regardless of the settlement of the forward purchase contract).

Accordingly, remarketing certain securities has significant financial implications for issuers and/or investors. Therefore, systems and methods for optimizing the remarketing of securities are needed.

SUMMARY

In one general aspect a unit may include a forward contract and a remarketable security that secures performance of obligations of the forward contract. The forward contract may require a holder to purchase a quantity of stock from an issuer at a settlement price on or before a settlement date. The remarketable security may have an issue denomination and a maturity date that is later than the settlement date. At the time of issue, the unit may provide that the remarketable security is to be offered to new holders at a remarketing time at a remarketing denomination that is different from the issue denomination.

Implementations may include one or more of the following features. For example, the unit may provide, at time of issue, that the remarketable security is to be remarketed with a remarketing coupon frequency different from an issue coupon frequency, without subordination to senior debt of the issuer, and/or without a previously available interest rate deferral option for the issuer. In general, the forward contract and the remarketable security are separable. For instance, the unit may have a purchase price separately allocated between fair market value of the forward contract and a fair market value of the remarketable security. Typically, the issuer cannot optionally redeem the remarketable security, and the remarketable security cannot be paid in or converted into stock of the issuer. In some cases, the remarketable security may be a debt security or a preferred security. The quantity of stock subject to the forward contract may be determined by a formula based on the stock price during a remeasurement period shortly before the expiration date of the forward contract.

In another general aspect, a method may include issuing a unit to a holder and offering, at a remarketing time, a remarketable security to one or more new investors at a remarketing denomination different from the issue denomination. The unit may include a forward contract and a remarketable security that secures obligations of the forward contract. The forward contract may require the holder to purchase a quantity of common stock from an issuer at a settlement price on or before a settlement date. The remarketable security may have an issue denomination and a maturity date later than the settlement date. The unit may provide the remarketing denomination at time of issue.

Implementations also may include selling the remarketable security to a new investor, satisfying the forward contract with proceeds obtained from the new investor, delivering a quantity of stock to the holder, and/or collecting a remarketing fee. The quantity of stock may be determined by a formula based on the stock price on the expiration date of the forward contract.

In another aspect, a computer system may include an issuing agent and a remarketing agent. The issuing agent may issue a unit to a holder. The unit may include a forward contract and a remarketable security that secures performance of obligations of the forward contract. The forward contract may require the holder to purchase a quantity of common stock from an issuer at a settlement price on or before a settlement date. The remarketable security may have an issue denomination and a maturity date later than the settlement date. The remarketing agent may offer, at a remarketing time, the remarketable security to one or more new investors at a remarketing denomination different from the issue denomination. The unit may provide the remarketing denomination at time of issue.

Implementations may include one or more of the following features. For example, the method may include offering, at a remarketing time, the remarketable security to one or more new investors at a remarketing coupon frequency different from an issue coupon frequency, without subordination to senior debt of the issuer, and/or without a previously available interest rate deferral option for the issuer. The unit may provide such conditions at time of issue.

Aspects of the present invention may be implemented by a computer program stored on a computer readable medium. The computer readable medium may comprise a disk, a device, and/or a propagated signal. Other features and advantages will be apparent from the following description, including the drawings, and from the claims.

DETAILED DESCRIPTION

The present invention is directed to structures, methods, and systems for remarketing securities. For simplicity, the basic components of such structures, methods, and systems are provided. However, as would be understood by one of ordinary skill in the art, the structures, systems and methods described below may include various other components, elements, and/or processes in actual implementation.

Figure 1:
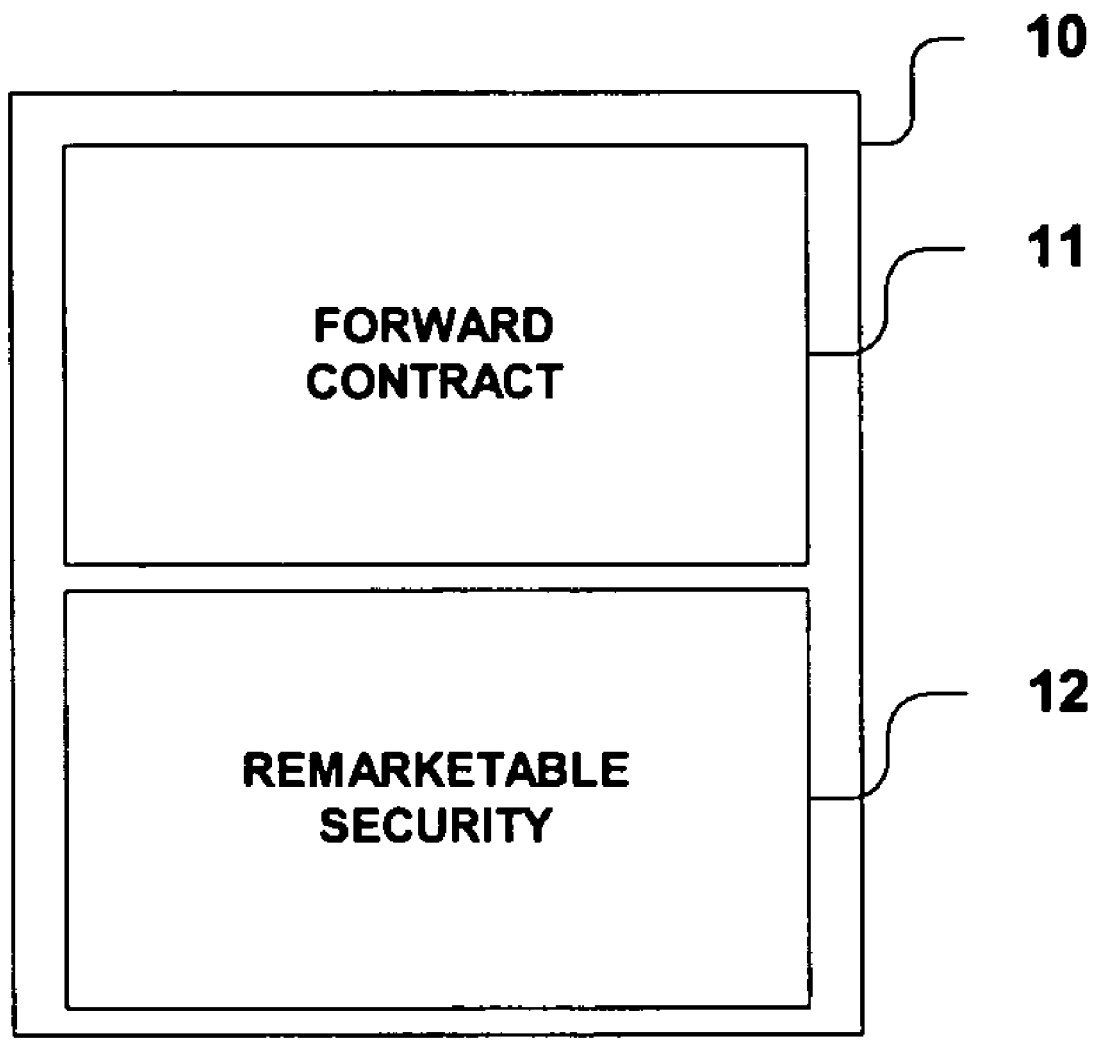
FIG. 1 is a diagram illustrating a unit according to one embodiment the present invention.

FIG. 1 illustrates one embodiment of a unit 10 including a forward contract 11 and a remarketable security 12 that secures performance of obligations of the forward contract 11 (e.g. the remarketable security is pledged as collateral). The unit 10, the forward contract 11 and/or the remarketable security 12 each may be embodied as one or more paper and/or electronic documents. The unit 10, the forward contract 11, and/or the remarketable security 12 generally may contain one or more legal rights and obligations and may be used in the context of financial transactions. In many cases, the unit 10 may be listed on a national securities exchange and may be freely assignable without restrictions on transfer.

In one implementation, the forward contract 11 may represent a promise to make a certain transaction at a future date. For example, the forward contract 11 may require delivery of an asset (e.g., commodity, bond, currency, stock) at a specified price on a specified future date. In some cases, the forward contract 11 may be standardized and may trade on a formal exchange. The forward contract 11 may include terms that require a holder to purchase a quantity of stock (e.g., common stock, preferred stock) from an issuer at a settlement price on or before a settlement date.

In one implementation, the remarketable security 12 may be structured to secure performance of obligations of the forward contract 11 through the settlement date of the forward contract 11. The remarketable security 12 will have a maturity date later than the settlement date set by the forward contract 11. The remarketable security 12 may have an issue denomination or face value, which may be assigned a nominal par value (e.g., $25 par value). The issue denomination may be assigned by the issuer and may or may not be related to the market price of issuer's stock.

In one embodiment, the remarketable security 12 may include a debt security, such as a note, having a principal amount and paying interest until the maturity date. The principal may be equal to the settlement price set by the forward contract 11. The interest may be payable at a fixed rate according to a coupon frequency, such as in quarterly payments, for example. The coupon frequency may include a payment on the settlement date.

In some embodiments, the debt security may be a subordinated deferrable interest note, which by definition, is subordinate to senior debt of the issuer and provides an interest rate deferral option to the issuer. The deferrable interest clause may allow the issuer to defer distributions for any reason before the maturity date. An issuer may desire to use subordinated/deferrable notes in order to achieve a certain credit rating.

In another implementation, the remarketable security 12 may include a preferred security, such as a trust preferred security. In general, trust preferred securities are a hybrid in which a special trust issues preferred stock to holders and, in turn, a company issues debt security to the special trust. The special trust is an intermediary for selling and administrating the trust preferred securities. Proceeds from the sale of the preferred securities to investors are used to buy debt securities from the company. The debt securities are generally subordinated deferrable interest unsecured debt, i.e., the lowest ranked of debt securities issued by a company. The company may have the option to dissolve the trust at any time. Upon dissolution of the trust, the company would interact directly with investors.

It is noted that unit 10 may include certain provisions and/or restrictions. For example, the unit 10 may provide that, in the event of bankruptcy of the issuer, the forward contract 11 will terminate and the associated remarketable security 12 is to be released to the holder. The unit 10 may provide that the issuer may not optionally redeem the remarketable security 12. In addition, the unit 10 may provide that the remarketable security 12 may not be payable in or convertible into stock of the issuer.

In some implementations, the unit 10 may provide the issuer with a unilateral right to change the term or maturity of the remarketable security 12. For example, in one embodiment, a unit 10 may include a 3-year forward contract 11 and a 33-year remarketable security 12. At or before the remarketing settlement date, the issuer may have the option to change the term of the remarketable security 12. For example, the issuer may have the right to change the term of the remarketable security 12 unilaterally so that instead of maturing in thirty years from the expiration of the forward contract, the remarketable security 12 will mature at an earlier date (e.g., two years, five years, ten years).

In some implementations, the unit 10 may provide the issuer with a unilateral right to add one or more financial covenants. Examples of financial covenants include, but are not limited to, a covenant to maintain a leverage ratio within a certain tolerance threshold, a covenant to maintain an interest ratio within a certain tolerance threshold, a covenant to maintain a certain operational cash flow (e.g., a covenant to maintain a certain operational cash flow, a covenant to maintain a certain EBIDTA, etc). Similarly, the unit 10 may provide the issuer with a unilateral right to make the remarketable security 12 callable after the remarketing.

The forward contract 11 and the remarketable security 12 generally may be treated as separate instruments. For example, the purchase price of a unit may be separately allocated between fair market value of the forward contract 11 and a fair market value of the remarketable security 12. In one embodiment in which the remarketable security is a note, the amount allocated to the note may be equal to its principal amount.

It should be noted that a holder is not economically bound to keep a unit 10 together and, in some cases, may wish to separate the forward contract 11 from the remarketable security 12 prior to the settlement date. One example would be where the holder transfers a unit 10 having a note back to the issuer together with a zero-coupon Treasury security and, in return, receives a separated note and a new unit that includes the forward contract and the zero-coupon Treasury security. In this way, the holder replaces the remarketable security with the zero-coupon Treasury security as the collateral pledged for the forward contract payment.

In some embodiments of a unit structure 10, the time between the settlement date of the forward contract and the maturity of the remarketable security 12 may be relatively long (e.g., two years, five years, ten years, thirty years, etc.). In such embodiments, the remarketable security 12 will be offered to new investors.

It is noted, however, that the types of investors that may be interested in purchasing the remarketable security 12 after the settlement date may be different than the type of investors that purchased the unit 10 at the outset. Namely, purchasers of units 10 typically are equity investors and purchasers of the remarketed securities are debt investors. Successful remarketing thus involves enhancing the offering of the remarketable security 12 so as to be attractive to debt investors.

In order to optimize the potential to remarket the securities, at the outset, the unit 10 may include built-in provisions regarding how the remarketable security 12 is to be offered to new investors. For example, debt investors typically do not deal in securities that have nominal par values (e.g., $25 par). In particular, corporate bonds usually have a par value of $1000, municipal bonds $5000, and federal bonds $10,000.

To make the remarketable security 12 attractive to debt investors, therefore, the unit 10 may provide that the remarketable security 12 is to be offered to new holders at a remarketing time (e.g., one or more remarketing dates, remarketing period) at a remarketing denomination (e.g., $1000 par value) different from the issue denomination (e.g., $25 par value).

In addition, debt investors typically deal in securities having a semi-annual coupon frequency. To make the remarketable security 12 attractive to debt investors, therefore, the unit 10 may provide that the remarketable security 12 is to be remarketed with a remarketing coupon frequency (e.g., semi-annually) different from an issue coupon frequency (e.g., quarterly).

Debt investors also normally deal in debt securities that are senior and non-deferrable. To make the remarketable security 12 attractive to debt investors, therefore, the unit 10 may provide that the remarketable security 12 is to be remarketed without subordination to senior debt of the issuer and/or without a previously available interest rate deferral option to the issuer.

Figure 2:
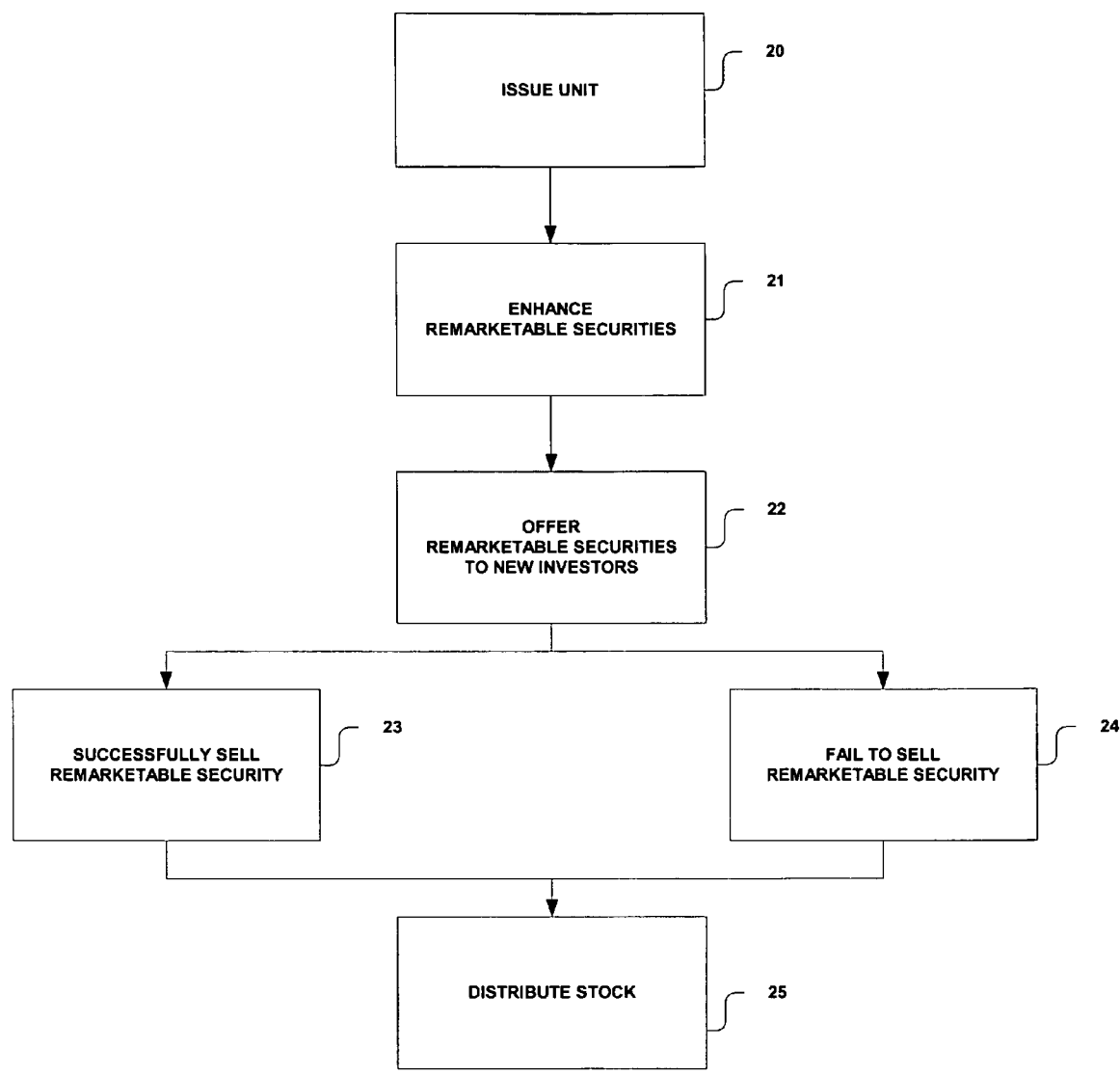
FIG. 2 is a flowchart illustrating a method according to one embodiment the present invention.

FIG. 2 illustrates a flowchart of one embodiment of a method for remarketing securities. In general, the method includes issuing a unit to a holder (step 20), enhancing the remarketable security (step 21), offering a remarketable security to new investors (step 22), selling the remarketable security (step 23) or failing to sell the remarketable security (step 24), and delivering a quantity of stock to the holder (step 25).

At step 20, a unit is issued to a holder. The issuer of a unit may be a company. The unit may be listed on a national securities exchange and may be freely assignable. In one implementation, the unit may include a forward contract and a remarketable security. The forward contract may require the holder to purchase a quantity of stock from the issuer at a settlement price on or before a settlement date. The remarketable security may be pledged to secure performance of obligations of the forward contract through the settlement date, may have an issue denomination, and may have a maturity date later than the settlement date.

At step 21, the remarketable security is enhanced. In some cases, the time between the settlement date and maturity of the remarketable security may be relatively long (e.g., two years, three years, etc.). In general, enhancing the remarketable security is designed to optimize the potential to sell the remarketable security to a new investor.

In one implementation, potential purchasers of the remarketable securities are debt investors. Since debt investors typically do not deal in securities that have nominal par values (e.g., $25 par), the remarketable security may be enhanced so that it is offered to new holders at a remarketing time (e.g., one or more remarketing dates) at a remarketing denomination (e.g., $1000 par value) different from the issue denomination (e.g., $25 par value). In addition, since debt investors typically deal in securities having a semi-annual coupon frequency, the remarketable security may be enhanced so that it is remarketed with a remarketing coupon frequency (e.g., semi-annually) different from an issue coupon frequency (e.g., quarterly). Also, since debt investors normally deal in debt securities that are senior and non-deferrable, the remarketable security may be enhanced so that it is offered to new investors without subordination to senior debt of the issuer and/or without a previously available interest rate deferral option for the issuer.

In some cases, the remarketable securities may be aggregated to form a group. In one implementation, a group of remarketable securities having the same maturity date is remarketed. The remarketing agent using a trust, for example, may aggregate the remarketable securities.

In one embodiment, the remarketable securities may be issued to the trust at the issue denomination and then provided from the trust in a remarketing denomination. Consent to the remarketing denomination may be required and obtained at issue. In some cases, a company may dissolve the trust on the settlement date and remarket junior debt as senior debt.

In another embodiment, the issue denomination of a remarketable security represents a beneficial interest. The beneficial interest may represent a portion of a remarketing denomination to be offered to new investors. For example, the remarketing denomination may be associated with a $1000 par value note and the issue denomination may be associated with a $25 par value beneficial interest in the $1000 par value note. The position of the holder will change at settlement, in the sense that the beneficial interest disappears and a new investor purchases a $1000 par value note. In some cases, all the beneficial interests are collected and canceled prior to remarketing.

On a remarketing date preceding the settlement date, a minimum price may be the aggregate principal amount of the remarketable securities. In some cases, the interest rate of a remarketable security may be changed to allow the remarketable security (e.g., debt security) to be sold for an amount equal to the minimum price. The remarketing may include all of the remarketable securities contained in units on the remarketing dates and/or the separated remarketable securities. The interest rate may be effective for the remaining term of the remarketable securities contained in the units on the remarketing dates and/or the separated remarketable securities.

At step 22, the remarketable security is offered to new investors on a remarketing date. In some implementations, a company may contract with a remarketing agent (e.g., investment bank) to sell the remarketable security. The remarketable securities may be traded on a primary exchange, a secondary exchange, and/or any other market.

At step 23, the remarketable security may be successfully sold to a new investor. The remarketing interest rate on all the securities goes into effect and the proceeds are used to satisfy the forward contract. Any excess proceeds may be distributed to the holders. The issuer also may pay the holders cash for any interest due.

In some cases, the remarketing agent may receive a remarketing fee, for example, one quarter of one percent of the minimum price. The debt may be remarketed at a premium with the remarketing fee paid to the remarketing agent out of the proceeds, or the debt may be remarketed at face value with the remarketing fee paid directly to the remarketing agent by the issuer.

At step 24, the remarketing agent may sometimes fail to sell to the remarketable security to a new investor. While unlikely, remarketing may fail if there are no investors willing to pay the minimum price for the remarketable security. In some cases, remarketing also may fail if some procedural step, for example, registering the debt security, has not been performed.

At step 25, a quantity of stock is delivered to the holder. In one implementation, where remarketing is successful, the forward contract is satisfied with proceeds obtained from the new investors and common stock is delivered to the holder. In another implementation, where remarketing is unsuccessful, the issuer disposes of the remarketable security by exercising rights as a secured party to satisfy the forward contract and common stock is delivered to the holder. In another implementation, where remarketing is unsuccessful, the investor is deemed to have put the remarketable security to the issuer under an automatic put provision. In one embodiment, the quantity of stock delivered to the holder is determined by a payoff function.

Figure 3A:
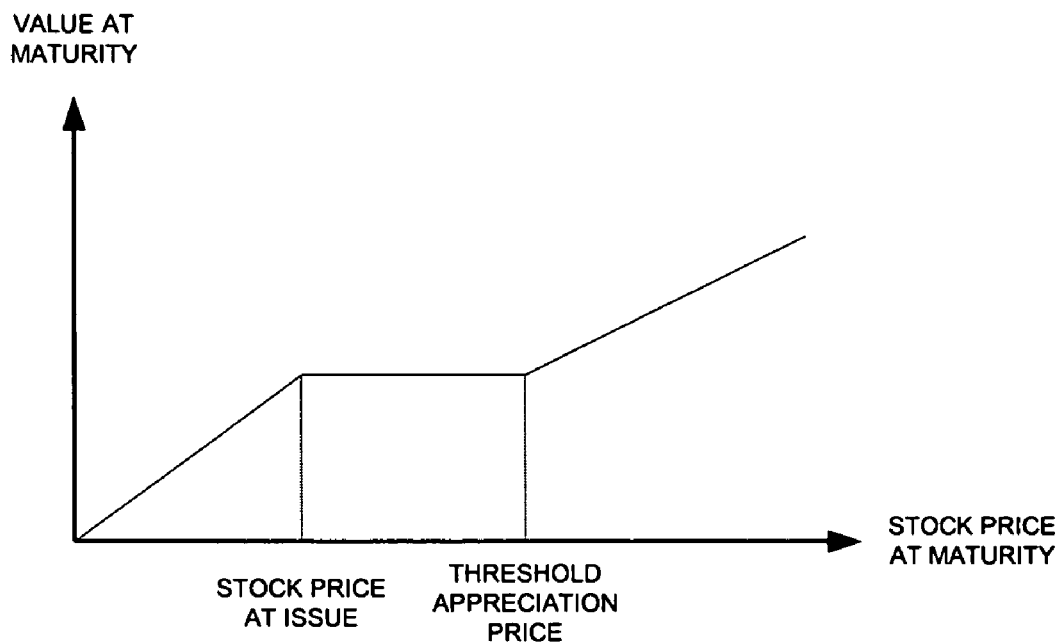
FIGS. 3A and 3B are graphs illustrating payoff functions according to one embodiment of the present invention.
Figure 3B:
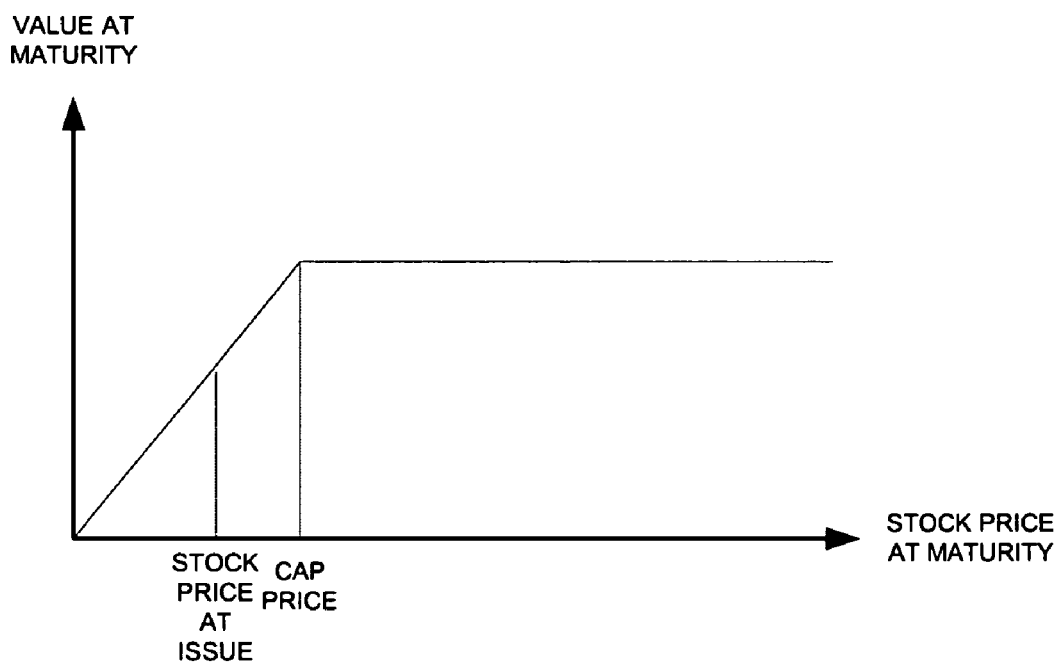

FIGS. 3A and 3B illustrate examples of payoff functions, which may be used in one embodiment of a forward contract according to the present invention. As shown in FIG. 3A, the Premium Equity Participating Securities (PEPs) payoff function provides that the investors keep all the downside below the stock price at issue. The investors keep no upside between the stock price at issue and some threshold appreciation price. Above the threshold price, the investors keep most of the upside. The company keeps all the upside between the issue price and threshold price and a little bit of the upside above the threshold price.

Referring to FIG. 3B, the Premium Equity Redemption Convertible Securities (PERCS®) payoff function provides that the investor keeps all the downside and all the upside to a cap price and then keeps no upside above the cap price. The company keeps no upside until some cap price and then keeps all of the upside above the cap price. Any combination of these or other payoff functions (e.g., delta one) may be used.

Figure 4:
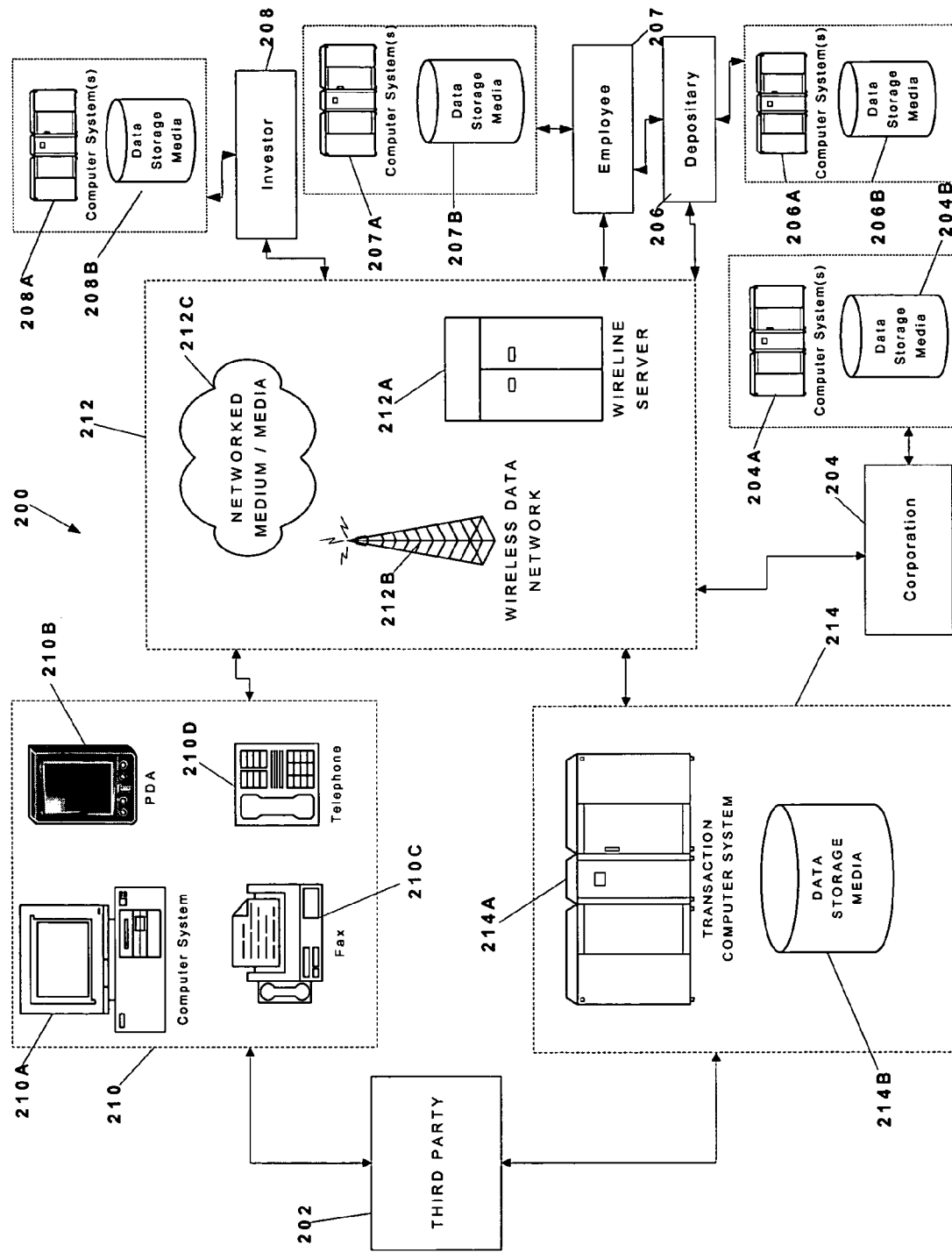
FIG. 4 is a diagram illustrating a system according to one embodiment of the present invention.

FIG. 4 is a diagram illustrating one embodiment of a system 200 in which aspects of the present invention may be used. As shown, a third party 202 such as, for example, an underwriter, an investment bank, or an entity can communicate and/or exchange data with one or more of a corporation 204, a depository 206 (e.g. The Depository Trust Company), an employee 207 and/or an investor 208.

In one implementation, the depository 206 may assign a unique identification such as a Committee Uniform Securities Identification Procedures (CUSIP) number, for example, to each security approved for trading. The CUSIP number may be used to track buy and sell orders for the units during issue and/or remarketing.

In one aspect, the third party 202 can be operatively associated with one or more communications devices 210 such as, for example and without limitation, a computer system 210A, a personal digital assistant 210B, a fax machine 210C, and/or a telephone 210D (e.g. a wireline telephone, a wireless telephone, a pager, and the like), and/or other like communication devices.

The communication devices 210 may permit the third party 202, the corporation 204, the depositary 206, the employee 207 and/or the investor 208 to communicate between/among each other through one or more communication media 212, such as by use of electronic mail communication through one or more computer systems, for example. The communication media 212 can include, for example and without limitation, wireline communication means such as a wireline server 212A, a wireless data network 212B, and/or a connection through a networked medium or media 212C (e.g., the Internet). In addition, the third party 202 (as well as any one or more of the corporation 204, the depositary 206, the employee 207 and/or the investor 208) can be operatively associated with one or more data processing/storage devices 214.

As illustrated in FIG. 4, the third party 202 can be operatively associated with a transaction computer system 214A, for example, and/or one or more data storage media 214B that can receive, store, analyze and/or otherwise process data and other information in association with communications that occur between/among the third party 202, the corporation 204, the depositary 206, the employee 207 and/or the investor 208.

In another aspect, the corporation 204 can be operatively associated with one or more computer systems 204A and/or one or more data storage media 204B. In another aspect, the depositary 206 can be operatively associated with one or more computer systems 206A and/or one or more data storage media 206B. In another aspect, the employee 207 can be operatively associated with one or more computer systems 207A and/or one or more data storage media 207B.

In another aspect, the investor 208 can be operatively associated with one or more computer systems 208A and/or one or more data storage media 208B. It can be appreciated that one or more of the computer systems (e.g., 204A, 206A, 207A, 208A, 214A) and one or more of the data storage media (e.g., 204B, 206B, 207B, 208B, 214B) can be employed to communicate, store, analyze, and/or otherwise process data related to financial transactions occurring between and/or among the third party 202, the corporation 204, the depositary 206, the employee 207 and/or the investor 208.

In one implementation, one or more elements of the system 200 may function as an issuing agent for issuing a unit to a holder and/or a remarketing agent for offering, on one or more remarketing dates. In one embodiment, the system 200 may be configured to store the units and automatically enhance the remarketable securities. For example, data entries within the system may expire or convert at a certain time (e.g., settlement date) to enhance the securities for remarketing.

The benefits of the present methods, systems and computer-readable media are readily apparent to those skilled in the art. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves. The various portions and components of various embodiments of the present invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A computer-implemented method for supporting the issuance and remarketing of a financial security comprising the steps of:
    issuing a unit to a holder, using an issuing computer system, wherein the unit comprises a forward contract and a remarketable security that secures performance of obligations of the forward contract, the forward contract requiring the holder to purchase a quantity of stock from an issuer at a settlement price on or before a settlement date, the remarketable security having an issue denomination and a maturity date, and wherein the remarketable security at issue is subordinate to senior debt of the issuer; and
    offering at a remarketing time, using a remarketing computer system, the remarketable security to one or more new investors at a remarketing denomination different from the issue denomination, wherein at the remarketing time the remarketable security is not subordinate to the senior debt of the issuer, and wherein the unit provides the remarketing denomination at time of issue,
    wherein the issuing computer system comprises at least one transaction computer and data storage media and is programmed to process data relating to the issuing of the unit, and
    wherein the remarketing computer system comprises at least one transaction computer and data storage media and is programmed to process data relating to the remarketing of the remarketable security.

2. The method of claim 1, further comprising the step of: changing the maturity date of the remarketable security on the remarketing date.

3. The method of claim 1, further comprising the step of: adding one or more financial covenants on the remarketing date.

4. The method of claim 1, further comprising the step of: making the remarketable security callable after the remarketing date.

5. The method of claim 1, further comprising the steps of: selling the remarketable security to a new investor; and satisfying the forward contract with proceeds obtained from the new investor.

6. The method of claim 1, further comprising the step of delivering a quantity of stock to the holder upon settlement of the forward contract.

7. The method of claim 6, wherein the quantity of stock is determined by a formula based on a price of the stock at expiration of the forward contract.

8. The method of claim 1, further comprising the step of collecting a remarketing fee.

9. The method of claim 1, wherein the remarketable security comprises a debt security.

10. The method of claim 1, wherein the remarketable security comprises a preferred security.

11. The method of claim 1, wherein the remarketing time comprises one or more remarketing dates.

12. The method of claim 1, wherein at issue the remarketable security has an issue coupon frequency, and wherein at the remarketing time, the remarketable security has a remarketing coupon frequency different from the issue coupon frequency, wherein the unit provides the remarketing coupon frequency at the time of issue.

13. The method of claim 1, wherein at the remarketing time, the remarketable security does not have a previously available interest rate deferral option to the issuer.

14. The method of claim 12, wherein at the remarketing time, the remarketable security does not have a previously available interest rate deferral option to the issuer.

15. A computer-implemented method for supporting the issuance and remarketing of a financial security comprising the steps of:
    issuing a unit to a holder, using an issuing computer system, wherein the unit comprises a forward contract and a remarketable security that secures performance of obligations of the forward contract, the forward contract requiring the holder to purchase a quantity of stock from an issuer at a settlement price on or before a settlement date, the remarketable security having an issue denomination and a maturity date later than the settlement date, and wherein the remarketable security at issue is subordinate to senior debt of the issuer; and offering, at a remarketing time, using a remarketing computer system, the remarketable security to one or more new investors at a remarketing coupon frequency different from an issue coupon frequency, wherein at the remarketing time the remarketable security is not subordinate to the senior debt of the issuer, and wherein the unit provides the remarketing coupon frequency at time of issue, wherein the issuing computer system comprises at least one transaction computer and data storage media and is programmed to process data relating to the issuing of the unit, and wherein the remarketing computer system comprises at least one transaction computer and data storage media and is programmed to process data relating to the remarketing of the remarketable security.

16. A computer-implemented method for supporting the issuance and remarketing of a financial security comprising the steps of:

issuing a unit to a holder, using an issuing computer system, wherein the unit comprises a forward contract and a remarketable security that secures performance of obligations of the forward contract, the forward contract requiring the holder to purchase a quantity of stock from an issuer at a settlement price on or before a settlement date, the remarketable security having an issue denomination, an issue coupon frequency, and a maturity date later than the settlement date; and offering, at a remarketing time, using a remarketing system, the remarketable security to one or more new investors, at a remarketing denomination different from the issue denomination and at a remarketing coupon frequency different form the issue coupon frequency, wherein the unit provides the remarketing denomination and the remarketing coupon frequency at issuance, wherein the issuing computer system comprises at least one transaction computer and data storage media and is programmed to process data relating to the issuing of the unit, and wherein the remarketing computer system comprises at least one transaction computer and data storage media and is programmed to process data relating to the remarketing of the remarketable security.

17. A computer-implemented method for supporting the issuance and remarketing of a financial security comprising the steps of: issuing a unit to a holder, using an issuing computer system, the unit comprising a forward contract and a remarketable security that secures performance of obligations of the forward contract, the forward contract requiring the holder to purchase of a quantity stock from an issuer at a settlement price on or before a settlement date, the remarketable security having an issue denomination and a maturity date later than the settlement date, wherein the remarketable security is subordinate to senior debt of the issuer at issuance of the unit, and wherein the unit provides that at a remarketing time, the remarketable security has a remarketing denomination different from the issue denomination and is without subordination to the senior debt, wherein the issuing computer system comprises at least one transaction computer and data storage media and is programmed to process data relating to the issuing of the unit.

18. A computer-implemented method for supporting the issuance and remarketing of a financial security comprising the steps of:

issuing a unit to a holder, using an issuing computer system, the unit comprising a forward contract and a remarketable security that secures performance of obligations of the forward contract, the forward contract requiring the holder to purchase a quantity of stock from an issuer at a settlement price on or before a settlement date, the remarketable security having an issue denomination and a maturity date later than the settlement date, wherein the remarketable security is subordinate to senior debt of the issuer at issuance of the unit, wherein at issue the remarketable security has an issue coupon frequency, and wherein the unit provides that at a remarketing time, the remarketable security has a remarketing coupon frequency different from the issue coupon frequency and is without subordination to the senior debt, wherein the issuing computer system comprises at least one transaction computer and data storage media and is programmed to process data relating to the issuing of the unit.

19. A computer-implemented method for supporting the issuance and remarketing of a financial security comprising the steps of:

issuing a unit to a holder, using an issuing computer system, the unit comprising a forward contract and a remarketable security that secures performance of obligations of the forward contract, the forward contract requiring the holder to purchase a quantity of stock from an issuer at a settlement price on or before a settlement date, the remarketable security having an issue denomination, and issue coupon frequency, and a maturity date later than the settlement date, and wherein the unit provides that at a remarketing time, the remarketable security, has a remarketing denomination different from the issue denomination and a remarketing coupon frequency different from the issue coupon frequency, wherein the issuing computer system comprises at least one transaction computer and data storage media and is programmed to process data relating to the issuing of the unit.

* * * * *